(12) United States Patent     (10) Patent No.:     US 12,665,958 B2

Inohiza                          (45) Date of Patent:          Jun. 23, 2026

(54) COMMUNICATION APPARATUS, INFORMATION PROCESSING APPARATUS, CONTROL METHOD, AND STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 17/459,397

(22) Filed: Aug. 27, 2021

(65) Prior Publication Data

US 2021/0392208 A1     Dec. 16, 2021

Related U.S. Application Data

(63) Continuation of application No. PCT/JP2020/006659, filed on Feb. 20, 2020.

(30) Foreign Application Priority Data

Feb. 28, 2019     (JP) ................................. 2019-036700

(51) Int. Cl.
|  |  |
|---|---|
| *H04L 69/18* | (2022.01) |
| *H04W 28/06* | (2009.01) |
| H04B 7/0413 | (2017.01) |
| H04W 84/12 | (2009.01) |

(52) U.S. Cl.
CPC ............. *H04L 69/18* (2013.01); *H04W 28/06* (2013.01); *H04B 7/0413* (2013.01); *H04W 84/12* (2013.01)

(58) Field of Classification Search
CPC ......... H04L 69/18; H04L 27/26; H04L 69/22; H04W 28/06; H04W 84/12; H04W 16/28; H04B 7/0413
See application file for complete search history.

(56) References Cited

U.S. PATENT DOCUMENTS

| | | | |
|---|---|---|---|
| 10,721,040 B2 * | 7/2020 | Suh ..................... | H04L 27/2613 |
| 12,543,179 B2 * | 2/2026 | Huang ................. | H04W 72/20 |
| 2017/0181136 A1 * | 6/2017 | Bharadwaj .......... | H04B 7/0452 |

(Continued)

FOREIGN PATENT DOCUMENTS

| | | |
|---|---|---|
| JP | 5901868 B1 | 4/2016 |
| JP | 2018050133 A | 3/2018 |

(Continued)

OTHER PUBLICATIONS

Wang et al., "Methods for HARQ scheduling and range extension for WLAN", U.S. Appl. No. 62/790,810, filed Jan. 10, 2019 (Year: 2019).*

Hongyuan Zhang (Marvell), Doppler comment resolutions, IEEE 802.11-17/0995r3, IEEE <URL:https1/mentor.ieee.org/802.11/dcn/17/11-17-0995-03-00ax-doppler-comment-resolutions.docx>, Sep. 2017 (Year: 2017).*

(Continued)

*Primary Examiner* — Thinh D Tran

(74) *Attorney, Agent, or Firm* — Canon U.S.A., Inc., IP Division

(57)     ABSTRACT

A physical layer (PHY) preamble that includes a Legacy Short Training Field (L-STF), a Legacy Long Training Field (L-LTF), a Legacy Signal Field (L-SIG), an Extremely High Throughput Signal A Field (EHT-SIG-A) including a field of four or more bits indicating the number of Space-Time Streams, an EHT Short Training Field (EHT-STF) and an EHT Long Training Field (EHT-LTF) in this order is used.

16 Claims, 4 Drawing Sheets

EHT SU PPDU

(56) References Cited

U.S. PATENT DOCUMENTS

| | | | | |
|---|---|---|---|---|
| 2017/0373816 A1* | 12/2017 | Son | .................... | H04W 74/085 |
| 2018/0145812 A1* | 5/2018 | Verma | .................. | H04L 5/0091 |
| 2020/0045656 A1* | 2/2020 | Verma | .................. | H04L 5/0044 |
| 2020/0177425 A1* | 6/2020 | Chen | .................. | H04L 27/2602 |
| 2021/0351820 A1* | 11/2021 | Huang | ................ | H04B 7/0452 |
| 2021/0385006 A1* | 12/2021 | Ryu | .................... | H04W 76/15 |
| 2022/0077964 A1* | 3/2022 | Wang | .................. | H04L 1/1825 |
| 2022/0124852 A1* | 4/2022 | Kim | .................... | H04L 1/1685 |
| 2022/0361170 A1* | 11/2022 | Park | .................... | H04L 27/262 |

FOREIGN PATENT DOCUMENTS

| | | | | | |
|---|---|---|---|---|---|
| JP | 2018513587 | A | | 5/2018 | |
| JP | 2019503151 | A | | 1/2019 | |
| KR | 2018086845 | A | * | 8/2018 | ............ F16B 13/063 |
| KR | 2018093682 | A | * | 8/2018 | ............ H04L 43/16 |
| KR | 2018100693 | A | * | 9/2018 | ........... F02M 59/027 |
| KR | 2018106202 | A | * | 10/2018 | ............ B60G 13/06 |
| WO | 2018/031873 | A1 | | 2/2018 | |

OTHER PUBLICATIONS

Ryu et al., "EHT operating mode indication", U.S. Appl. No. 62/750,196, filed Oct. 24, 2018 (Year: 2018).*

Chen et al., "Extreme high throughput packet signaling", U.S. Appl. No. 62/801,796, filed Feb. 6, 2019 (Year: 2019).*

Kim et al., "UL transmission in Multi-AP WLAN", U.S. Appl. No. 62/797,375, filed Jan. 28, 2019 (Year: 2019).*

Eunsung Park (LG Electronics), Overview of PHY Features for EHT, IEEE 802.1, 18/1967rl, IEEE, <URL:https://mentor.ieee.org/802.11/dcn/18/11-18-1967-01-Ocht-overview-of-phy-features-for-eht.pptx>, Jan. 2019.

Hongyuan Zhang (Marvell), Doppler comment resolutions, IEEE 802.11-17/0995r3, IEEE, <URL:https1//mentor.ieee.org/802.11/dcn/17/11-17-0995-03-00ax-doppler-comment-resolutions.docx> Sep. 2017.

Ensung Park et al; LG Electronics; Overview of PHY Features for EHT; IEEE 802.11-18/1967r1; Jan. 2019; pp. 1-22.

Robert Stacey (Intel), Proposed TGax draft specification, IEEE 802.11-160024r0, IEEE, Jan. 2010.

* cited by examiner

EHT SU PPDU

| L-STF | L-LTF | L-SIG | RL-SIG | EHT-SIG-A | EHT-STF | EHT-LTF | ------ | EHT-LTF | Data | Packet Extension |
| 301 | 302 | 303 | 304 | 305 | 306 | | 307 | | 308 | 309 |

EHT ER PPDU

| L-STF | L-LTF | L-SIG | RL-SIG | EHT-SIG-A | EHT-STF | EHT-LTF | ⋯ | EHT-LTF | Data | Packet Extension |
| 401 | 402 | 403 | 404 | 405 | 406 | | 407 | | 408 | 409 |

COMMUNICATION APPARATUS, INFORMATION PROCESSING APPARATUS, CONTROL METHOD, AND STORAGE MEDIUM

CROSS-REFERENCE TO RELATED APPLICATIONS

This application is a Continuation of International Patent Application No. PCT/JP2020/006659, filed Feb. 20, 2020, which claims the benefit of Japanese Patent Application No. 2019-036700, filed Feb. 28, 2019, both of which are hereby incorporated by reference herein in their entirety.

BACKGROUND OF THE INVENTION

Field of the Invention

The present invention relates to an apparatus in compliance with the Institute of Electrical and Electronics Engineers (IEEE) 802.11 series standards.

Background Art

The IEEE 802.11 series standards are known as communication standards regarding a Wireless Local Area Network (wireless LAN). The IEEE 802.11ax standard achieves a high throughput using the Multi-Input Multi-Output (MIMO) technique for carrying out communication using a plurality of antennas (PLT 1).

Currently, a Study Group called IEEE 802.11 Extremely High Throughput (EHT) is launched as a successor standard to the IEEE 802.11ax standard with the aim of further improvement of the throughput.

CITATION LIST

Patent Literature

PTL 1: Japanese Patent Laid-Open No. 2018-50133

A method currently under consideration as one of measures for the improvement of the throughput pursued by EHT is to increase the number of spatial streams (Space-Time Streams, hereinafter referred to as SSs) according to the MIMO method up to 16.

However, conventionally, there has been no physical layer (PHY) preamble structure capable of notifying a communication partner apparatus that the number of streams is 9 or greater, and therefore the communication partner apparatus has been unable to be notified that the number of streams is, for example, 16 in the PHY preamble.

SUMMARY OF THE INVENTION

In consideration of the above-described problem, the present invention is directed to allowing a communication apparatus or an information processing apparatus to communicate information indicating that the number of streams is 9 or greater in a PHY frame.

According to an aspect of the present invention, a communication apparatus includes a transmission unit configured to transmit a first frame including a physical layer (PHY) preamble and a data field, wherein the PHY preamble includes a Legacy Short Training Field (L-STF), a Legacy Long Training Field (L-LTF), a Legacy Signal Field (L-SIG), an Extremely High Throughput (EHT) Signal A Field (EHT-SIG-A), an EHT Short Training Field (EHT-STF), and an EHT Long Training Field (EHT-LTF) in this order, wherein the EHT-SIG-A includes a field of four or more bits indicating the number of Space-Time Streams, and wherein the data field contains data transmitted with as many streams as the number of Space-Time Streams.

According to another aspect of the present invention, a communication apparatus includes a reception unit configured to receive a frame including a PHY preamble and a data field and a processing unit configured to process the frame received by the reception unit, wherein the PHY preamble includes a Legacy Short Training Field (L-STF), a Legacy Long Training Field (L-LTF), a Legacy Signal Field (L-SIG), an Extremely High Throughput (EHT) Signal A Field (EHT-SIG-A), an EHT Short Training Field (EHT-STF), and an EHT Long Training Field (EHT-LTF) in this order, wherein the EHT-SIG-A includes a field of four or more bits indicating the number of Space-Time Streams, and wherein the processing unit processes data contained in the data field and transmitted with as many streams as the number of Space-Time Streams.

According to yet another aspect of the present invention, an information processing apparatus includes a generation unit configured to generate a frame including a PHY preamble, wherein the PHY preamble includes a Legacy Short Training Field (L-STF), a Legacy Long Training Field (L-LTF), a Legacy Signal Field (L-SIG), an Extremely High Throughput (EHT) Signal A Field (EHT-SIG-A), an EHT Short Training Field (EHT-STF), and an EHT Long Training Field (EHT-LTF) in this order, and wherein the EHT-SIG-A includes a field of four or more bits indicating the number of Space-Time Streams.

Further features of the present invention will become apparent from the following description of exemplary embodiments with reference to the attached drawings.

DESCRIPTION OF THE EMBODIMENTS

Figure 1:
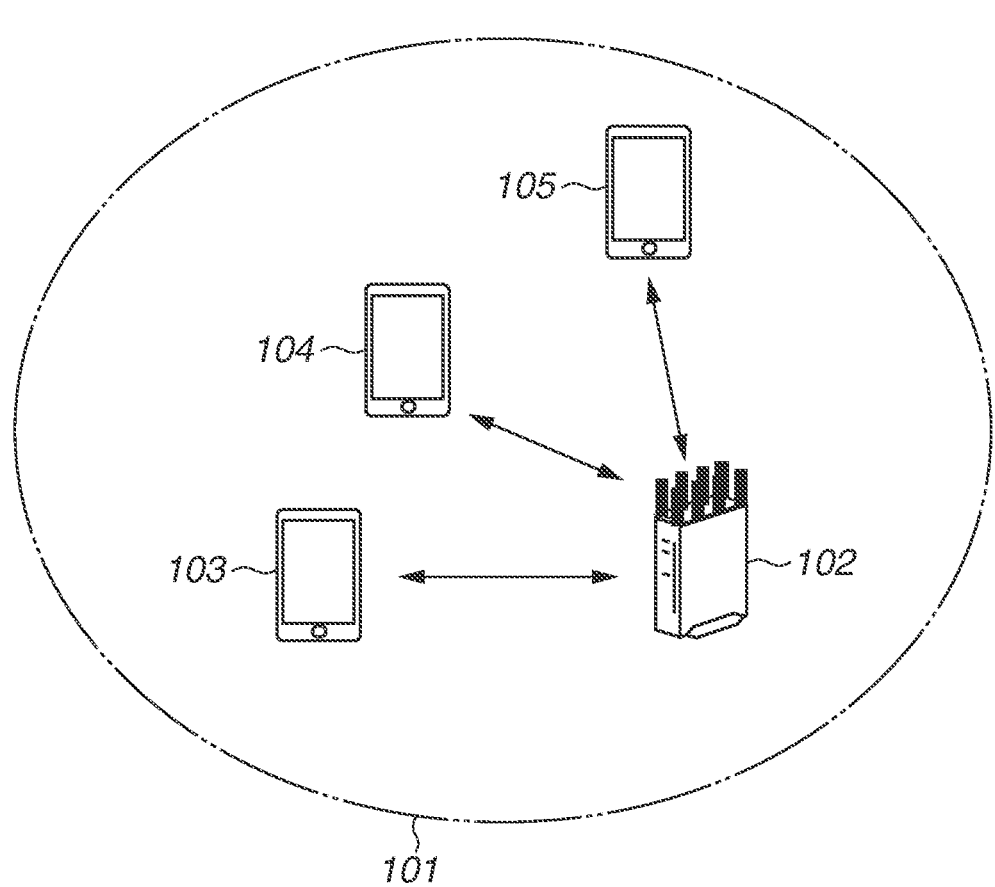
FIG. 1 illustrates a network configuration.

FIG. 1 illustrates an example of a network configuration according to an exemplary embodiment of the present invention. A wireless communication system illustrated in FIG. 1 is a wireless network including a base station 102 and a plurality of stations (hereinafter referred to as STAs) 103, 104, and 105. Here, the base station 102 is, for example, an access point (hereinafter referred to as an AP) in compliance with the Institute of Electrical and Electronics Engineers (IEEE) 802.11 series standards. However, the base station 102 is not limited thereto, and may be a Group Owner (hereinafter referred to as a GO) in compliance with the Wireless Fidelity (Wi-Fi) Direct standard. In the case where the base station 102 is a GO, the plurality of STAs 103 to 105 is also called Clients.

The base station 102 constructs a wireless network 101, and transmits a beacon containing identification information of the wireless network 101. Here, a dotted line illustrated as the wireless network 101 in FIG. 1 indicates a range where a signal transmitted from the base station 102 reaches, and the base station 102 can communicate with an STA located within the range indicated by the dotted line. Further, the base station 102 may have a relay function.

When receiving a Probe Request signal (a probe request) from an STA, the base station 102 transmits a Probe Response signal (a probe response) containing the identification information as a response. The identification information of the wireless network 101 is, for example, a Service Set Identifier (hereinafter referred to as an SSID).

Further, the base station 102 communicates with each of the STAs 103 to 105 according to a wireless communication method in compliance with the IEEE 802.11 Extremely High Throughput (EHT) standard. The base station 102 establishes a wireless link with each of the STAs 103 to 105 via a predetermined association process and the like. Further, the base station 102 and each of the STAs 103 to 105 include a plurality of antennas, and can transmit data at a high throughput using Multi-Input Multi-Output (MIMO) communication. For example, in a case where the base station 102 and the STAs 103 to 105 each include 16 antennas, MIMO communication with 16 streams (Space-Time Streams) can be carried out in communication between the base station 102 and the STA.

Here, MIMO is a technique for improving the use efficiency of channel resources by causing a plurality of antennas provided to a single communication apparatus or a plurality of communication apparatuses to use the same channel at the same time. In the present exemplary embodiment, communication using this MIMO technique will be referred to as the MIMO communication.

Especially, the MIMO communication carried out between the base station 102 and one STA will be referred to as a single-user MIMO (Single User MIMO, hereinafter referred to as SU MIMO). On the other hand, the MIMO communication carried out between the base station 102 and a plurality of STAs will be referred to as multiple-user MIMO (Multi User MIMO, hereinafter referred to as MU MIMO).

Figure 2:
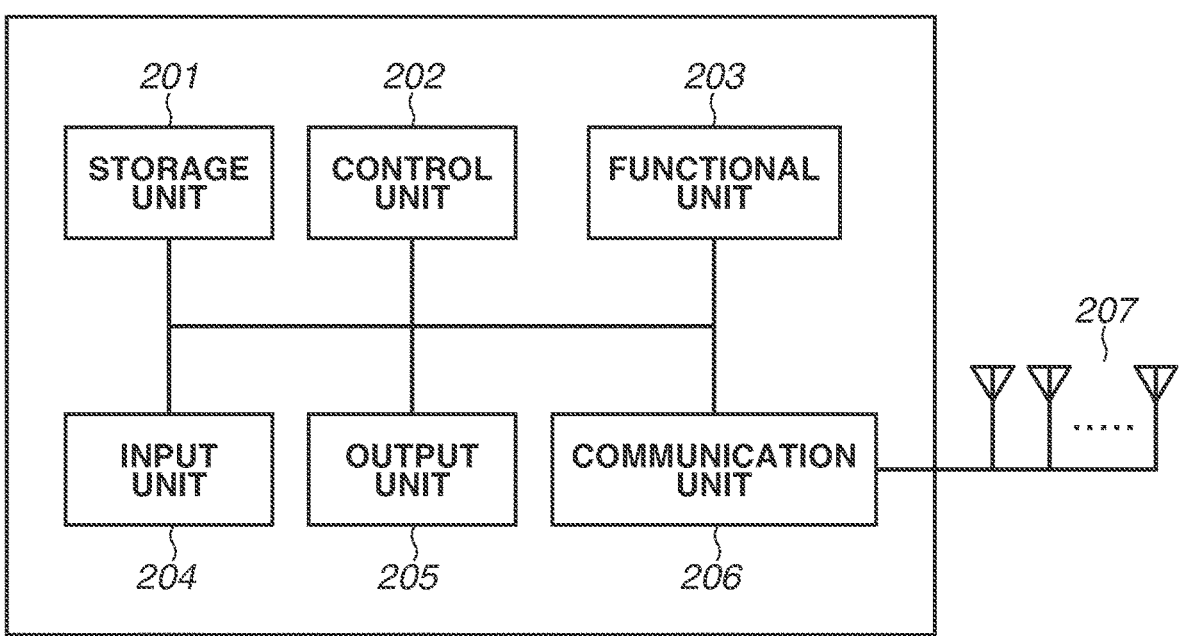
FIG. 2 illustrates a hardware configuration of a communication apparatus.

FIG. 2 illustrates the hardware configuration provided to each of the base station 102 and the STAs 103 to 105 (hereinafter collectively referred to as the communication apparatus). The communication apparatus includes a storage unit 201, a control unit 202, a functional unit 203, an input unit 204, an output unit 205, a communication unit 206, and a plurality of antennas 207.

The storage unit 201 includes one or more memories such as a read only memory (ROM) and a random access memory (RAM), and stores therein programs for performing various kinds of operations that will be described below and various kinds of information such as a communication parameter for wireless communication. Examples usable as the storage unit 201 include storage media such as a flexible disk, a hard disk, an optical disk, a magneto-optical disk, a compact disk (CD)-ROM, a CD recordable (CD-R), a magnetic tape, a nonvolatile memory card, and a digital versatile disk (DVD), besides the memory such as the ROM and the RAM. Further, the storage unit 201 may include a plurality of memories or the like.

The control unit 202 may be formed by one or more processors such as a central processing unit (CPU) and a micro processing unit (MPU), an application specific integrated circuit (ASIC), a digital signal processor (DSP), a field programmable gate array (FPGA), and/or the like. The control unit 202 controls the communication apparatus by executing the program stored in the storage unit 201. The control unit 202 may be configured to control the communication apparatus based on a cooperation between the program stored in the storage unit 201 and an operating system (OS). Further, the control unit 202 may include a plurality of processors such as a multi-core processor, and be configured to control the communication apparatus thereby.

Further, the control unit 202 controls the functional unit 203 to cause the functional unit 203 to execute a predetermined function. The predetermined function is, for example, an imaging function if the communication apparatus is a camera. Alternatively, the predetermined function is a printing function if the communication apparatus is a printer. Alternatively, the predetermined function is, for example, a projection function if the communication apparatus is a projector. The predetermined function is not limited thereto, and can be various functions. The functional unit 203 is hardware for executing the predetermined function.

The input unit 204 receives various kinds of operations from a user. The output unit 205 presents various kinds of outputs to the user. Here, the output by the output unit 205 includes at least one of a display on a screen, an audio output by a speaker, an output of a vibration, and the like. The communication apparatus may be configured to realize both the input unit 204 and the output unit 205 as one module, like a touch panel.

The communication unit 206, for example, controls wireless communication in compliance with the IEEE 802.11 EHT standard, controls wireless communication in compliance with Wi-Fi, and controls Internet Protocol (IP) communication. Further, the communication unit 206 transmits and receives a wireless signal for wireless communication by controlling the antennas 207. In the present example, the antennas 207 include 16 antennas to allow the MIMO communication with 16 streams in compliance with the IEEE 802.11 EHT standard. The number of antennas 207 is not limited to 16.

Figure 3:
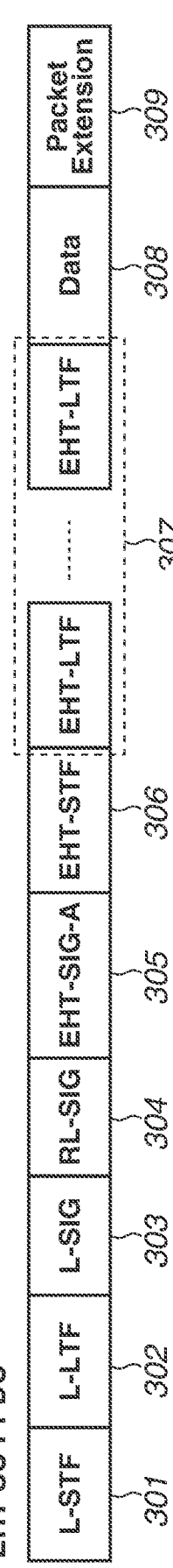
FIG. 3 illustrates a structure of a physical layer (PHY) frame of an Extremely High Throughput Single User Physical layer Protocol Data Unit (EHT SU PPDU).

Next, a description will be given of a frame structure that the communication apparatus according to the present exemplary embodiment transmits and receives for the wireless communication in compliance with the IEEE 802.11 EHT standard with reference to FIGS. 3 and 4. FIG. 3 illustrates an EHT Single User (SU) Physical layer Protocol Data Unit (PPDU) as a first example of this frame. The EHT SU PPDU is a frame used when the SU MIMO communication is carried out. A physical layer will be referred to as a PHY for short.

Figure 4:
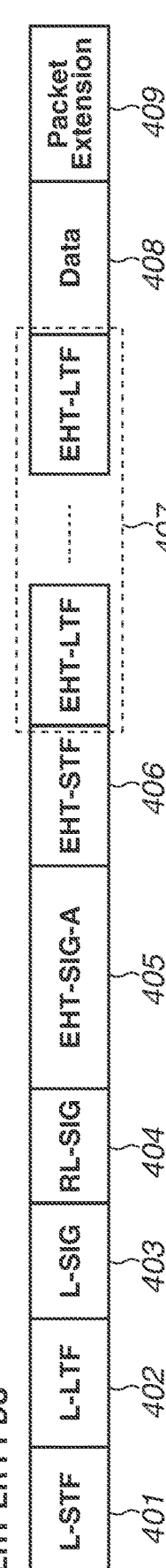
FIG. 4 illustrates a structure of a PHY frame of an EHT Extended Range (ER) SU PPDU.

FIG. 4 illustrates an EHT Extended Range (ER) Single User (SU) Physical layer Protocol Data Unit (PPDU) as a second frame example. The EHT ER SU PPDU is a frame used when the SU MIMO communication is carried out with an extended communication distance. These frames will be collectively referred to as an EHT PPDU.

The EHT PPDU includes a physical layer (hereinafter referred to as a PHY) preamble and a data field. The PHY preamble includes a Short Training Field (STF), a Long Training Field (LTF), and a Signal Field (SIG).

First, the frame structure of the EHT SU PPDU will be described with reference to FIG. 3. The EHT SU PPDU illustrated in FIG. 3 is a PPDU used in the MIMO communication.

The PHY preamble is placed at the beginning of the EHT SU PPDU. A Legacy Short Training Field (L-STF) 301, a Legacy Long Training Field (L-LTF) 302, and a Legacy Signal Field (L-SIG) 303 are placed in this order from the beginning of the PHY preamble to maintain backward compatibility with legacy devices. Here, the legacy devices refer to non-EHT devices (devices out of compliance with the EHT standard), i.e., devices in compliance with any standard among IEEE 802.11a, b, g, n, ac, and ax.

Further, the L-STF is used for, for example, detection of a PHY frame signal, automatic gain control (AGC), and timing detection.

The L-LTF 302 is placed immediately after the L-STF 301. The L-LTF is used to, for example, highly accurately synchronize a frequency and time and acquire propagation channel information (Channel State Information (CSI)).

Further, the L-SIG 303 is placed immediately after the L-LTF 302. The L-SIG is used to, for example, transmit control information including information indicating a data transmission rate and a PHY frame length.

The above-described various kinds of legacy fields (the L-STF 301, the L-LTF 302, and the L-SIG 303) share a common structure with the frames of IEEE 802.11a, b, g, n, ac, and ax. Due to this structure, the legacy devices can decode data in the above-described various kinds of legacy fields.

An EHT Signal A Field (EHT-SIG-A) 305 is placed immediately after the L-SIG 303. The EHT-SIG-A includes an EHT-SIG-A1 and an EHT-SIG-A2 in this order. The EHT-SIG-A1 and the EHT-SIG-A2 contain information indicated in a table 1 and information indicated in a table 2, respectively. These pieces of information are used in processing for receiving the EHT PPDU.

The PHY preamble may be configured to include a Repeated L-SIG (RL-SIG) 304 between the L-SIG 303 and the EHT-SIG-A 305. The RL-SIG 304 is a field containing the same content as the L-SIG 303.

TABLE 1

|  | Bit Position | Subfield | Number of Bits | Description |
|---|---|---|---|---|
| EHT-SIG-A1 | B0 | Format | 1 | Set to 1 for an "EHT PPDU and EHT ER PPDU" to differentiate them from an EHT TB PPDU. |
|  | B1 | Beam Change | 1 | Set to 1 when the pre EHT of the PPDU is mapped in a space different from the first symbol of the EHT-LTF. Set to 0 when the pre EHT of the PPDU is mapped in the same way as the first symbol of the EHT-LTF. |
|  | B2 | Uplink (UL)/Downlink (DL) | 1 | Indicates whether the PPDU is transmitted for UL or DL. Set to the same value as TXVECTOR UPLINK_FLAG. |
|  | B3-B6 | Modulation and Coding Scheme (MCS) | 4 | The value in Modulation and Coding Scheme. Set n = 0, 1, 2, . . . or 11 (12 to 15 are reserved) for an EHT SU PPDU. Set n = 0, 1, or 2 (3 to 15 are reserved areas) for an EHT ER SU PPDU and Bandwidth = 0. Set n = 0 (1 to 15 are reserved areas) for MCS 0 for an EHT ER SU PPDU and Bandwidth = 1. |
|  | B7 | Dual Carrier Modulation (DCM) | 1 | Indicates whether Dual Carrier Modulation is applied to the data field. Set to 1 when the Space-Time Block Coding (STBC) field is 0 (when both the DCM and STBC fields are 1, neither of them is applied). Set to 0 when DCM is not applied. |
|  | B8-B13 | Basic Service Set (BSS) Color | 6 | A value of 6 bits for identifying the BSS. |
|  | B14-B17 | Spatial Reuse | 4 | Indicates whether Spatial Reuse is permitted during the transmission of this PPDU. Set to the value of Spatial Reuse field encoding indicated in another table. |
|  | B18-B19 | Bandwidth | 2 | For an EHT SU PPDU, set to 0, 1, 2, and 3 for 20 MHz, 40 MHz, 80 MHz, and 160 MHz (80 + 80 MHz), respectively. For an EHT ER SU PPDU, set to 0 and 1 for 242-tone Resource Unit (RU) and upper 106-tone RU in primary 20 MHz, respectively. |

TABLE 1-continued

| Bit Position | Subfield | Number of Bits | Description |
|---|---|---|---|
| B20-B21 | Guard Interval (GI) + LTF Size | 2 | Indicates the Guard Interval duration and the EHT-LTF size. Set to 0 for 1x EHT-LTF and 0.8 µs GI. Set to 1 for 2x EHT-LTF and 0.8 µ GI. Set to 2 for 2x EHT-LTF and 1.6 µs GI. Set to 3 for both the DCM and STBC fields set to 1, and 4x EHT-LTF and 0.8 µs GI. Set to 3 for 4x EHT-LTF and 3.2 µs GI other than the above. |
| B22-B25 | Number of Space-Time Streams (NSTS) And Midamble Periodicity | 4 | The number of Space-Time Streams and the midamble periodicity for frame synchronization. When the Doppler field is 0, set to the number of Space-Time Streams - 1. When the Doppler field is 1, B22-B24 indicate the number of Space-Time streams, and B25 is set to 0 and 1 when the midamble periodicity is 10 and 20, respectively. |

TABLE 2

| | Bit Position | Subfield | Number of Bits | Description |
|---|---|---|---|---|
| EHT-SIG-A2 | B0-B6 | TXOP | 7 | Transmission Opportunity. Set to 127 when TXOP_DURATION of TXVECTOR is set to UNSPECIFIED and no duration information is present. Set to a value smaller than 127 to set Network Allocation Vector (NAV) when TXOP_DURATION of TXVECTOR is smaller than 512. In this case, B1-B6 are set to floor (round-down) of TXOP_DURATION/8 when B0 is 0. B1-B6 are set to floor of (TXOP_DURATION - 512)/8 when B0 is 1. |
| | B7 | Coding | 1 | Set to 0 and 1 for Binary Convolutional Code (BCC) and Low Density Parity Check (LDPC), respectively. |
| | B8 | LDPC Extra Symbol Segment | 1 | Indicates whether the extra Orthogonal Frequency-Division Multiplexing (OFDM) symbol segment for LDPC is present. |
| | B9 | STBC | 1 | This field is set to 1 when STBC (Space-Time Block Coding) is used and DCM is 0. This field is also set to 1 when neither DCM nor STBC is used. This field is set to 0 otherwise. |
| | B10 | Beamformed | 1 | Set to 1 when beamforming steering is applied to the waveform in SU transmission. |
| | B11-B12 | Pre-Forward Error Correction (FEC) Padding Factor | 2 | Set to 0, 1, 2, and 3 when the Pre-FEC Padding Factor is 4, 1, 2, and 3, respectively. |
| | B13 | Packet Extension (PE) Disambiguity | 1 | The Disambiguity field of Packet Extension. |

TABLE 2-continued

| Bit Position | Subfield | Number of Bits | Description |
| --- | --- | --- | --- |
| B14 | Reserved | 1 | Reserved area. |
| B15 | Doppler | 1 | Set to 1 when any of the following conditions is satisfied: the number of OFDM symbols in the data field is greater than a "value indicated by the midamble periodicity + 1" and the midamble is present, and the number of OFDM symbols in the data field is equal to or smaller than the "value indicated by the midamble periodicity + 1", the midamble is not present, and the channel is varying fast. |
| B16-B19 | Cyclic Redundancy Check (CRC) | 4 | CRC for the EHT-SIG-A (total 41 bits of 26 bits in A1 and 16 bits until B15 in A2) field so far. |
| B20-B25 | Tail | 6 | The area set to 0 to indicate termination to the trellis convolutional decoder. |

Now, a description will be given of a field indicating the number of Space-Time Streams (SS) included in the EHT-SIG-A1, i.e., a field indicating the number of streams. In the present example, this field will be referred to as an NSTS And Midamble Periodicity field. The NSTS And Midamble Periodicity field is formed by four bits, and is positioned from B22, which comes after 22 bits from the first bit in the EHT-SIG-A1, to B25.

Values settable as the number of streams indicated in the field vary depending on the value in the Doppler field in the EHT-SIG-A2. When the value in the Doppler field is 0, this means that the channel is less changing, and any value from 1 to 16 can be set as the number of streams. In the present example, a value acquired by subtracting 1 from the actual number of streams is stored in this field. More specifically, for example, "0" is stored in all of the four bits to indicate 1 stream. Further, for example, "1" is stored in all of the four bits to indicate 16 streams.

On the other hand, when the value in the Doppler field is 1, this means that the channel is largely changing, and the values settable as the number of streams are limited to 1 to 8. This case means that only the three bits in the first half indicate the number of streams. Even in this case, because the last single bit in the NSTS And Midamble Periodicity field indicates the midamble periodicity, four bits are secured as the field length thereof.

The NSTS And Midamble Periodicity field may be configured to allow the number of SSs to be set to 1 to 16 independently of the value in the Doppler field.

Further, four bits are allocated to the NSTS And Midamble Periodicity field in the present exemplary embodiment, and this allows the NSTS And Midamble Periodicity field to indicate up to 16 as the number of streams. However, the NSTS And Midamble Periodicity field may be configured to indicate a greater number of streams than 16 by allocating five or more bits, in preparation for possible extension in a further successor standard to the IEEE 802.11 EHT standard. In this manner, 9 or a greater number can be indicated as the number of streams by allocating four or more bits to the NSTS And Midamble Periodicity field.

An EHT Short Training Field (EHT-STF) 306 is placed immediately after the EHT-SIG-A 305 containing such information about the number of streams. The EHT-STF is used to improve the automatic gain control in the MIMO communication.

Then, an EHT Long Training Field (EHT-LTF) 307 is placed immediately after the EHT-STF 306. The EHT-LTF is used to estimate the channel in the MIMO communication.

A data field 308 is placed immediately after the EHT-LTF 307. A Packet Extension 309, which is an extended field, may be placed immediately after the data field 308. The data field 308 contains MIMO communication data transmitted with the number of streams indicated in the NSTS And Midamble Periodicity field in the EHT-SIG-A1.

Upon receiving the EHT SU PPDU, the communication apparatus recognizes the number of streams based on the NSTS And Midamble Periodicity field in the EHT-SIG-A1. Then, the communication apparatus performs processing according to the recognized number of streams, thereby performing processing for receiving the MIMO communication data transmitted with, for example, 16 streams.

Next, the frame structure of the EHT ER SU PPDU will be described with reference to FIG. 4. The EHT ER SU PPDU also has a similar structure to the EHT SU PPDU. More specifically, the fields are placed in the order of an L-STF 401, an L-LTF 402, an L-SIG 403, an EHT-SIG-A 405, an EHT-STF 406, an EHT-LTF 407, and a data field 408. An RL-SIG 404 may also be placed between the L-SIG 403 and the EHT-SIG-A 405 similarly to the EHT SU PPDU. Further, a Packet Extension 409 may also be placed immediately after the data field 408 similarly to the EHT-SU PPDU. Further, the information contained in each of the fields is also similar to the content contained in each of the fields in the EHT SU PPDU, and therefore the description thereof will be omitted herein.

Next, a description will be given of the operation of the communication apparatus when these frames are transmitted or received. When the base station 102 transmits the EHT PPDU, the control unit 202 of the base station 102 generates data to be contained in the data field 308 or 408. This generation is realized by the control unit 202 reading out the program stored in the storage unit 201 of the base station 102 and executing it. Then, a frame containing the data and including the above-described PHY preamble is generated by the control unit 202, the communication unit 206, or cooperation of them. Then, the communication unit 206 transmits the generated frame via the antennas 207.

On the other hand, the communication unit 206 of the STA 103 receives the EHT PPDU having the above-described frame structure from the base station 102. Then, the control unit 202 or the communication unit 206 of the STA 103 recognizes the number of streams for the data field by referring to the NSTS And Midamble Periodicity field included in the EHT-SIG-A1 in the PHY preamble. Then, the communication unit 206 of the STA 103 performs the processing according to the recognized number of streams, thereby performing the processing for receiving the MIMO communication data transmitted with, for example, 16 streams. Then, the control unit 202 acquires the data acquired by the reception processing from the communication unit 206. The control unit 202 of the STA 103 performs various kinds of control such as output control (for example, display or printing of the data) based on the data acquired in such a manner.

The present exemplary embodiment can also be implemented on an information processing apparatus (for example, a chip) that generates the above-described PHY preamble, besides the base station 102 and the STAs 103 to 105, each of which is the communication apparatus. In this case, desirably, this information processing apparatus is connectable to a plurality of antennas.

Using this frame structure of the EHT PPDU allows the communication apparatus or the information processing apparatus to communicate information indicating that the number of streams is 9 or greater in the PHY frame. EHT has been described as being an abbreviation for Extremely High Throughput in the above description, but may be interpreted as being an abbreviation for Extreme High Throughput.

Further, an EHT-SIG-A in a PHY preamble in an EHT MU PPDU, which is a PPDU used in the MU MIMO communication, may be configured not to include the NSTS And Midamble Periodicity field therein. More specifically, when the base station 102 transmits the EHT MU PPDU, the field of four or more bits indicating the number of streams is not included in the EHT-SIG-A included in this EHT MU PPDU. Further, a PHY preamble in the beacon and the Probe Response signal transmitted from the base station 102 may be configured not to include the EHT-SIG-A although including the legacy fields. In this manner, the base station 102 can also switch whether to place the EHT-SIG-A and whether to place the field of four or more bits indicating the number of streams in the EHT-SIG-A according to a signal to transmit.

Further, the order in which the subfields of the EHT-SIG-A1 and A2 are arranged is not limited to the above-described example, and may be changed as necessary. Further, the PHY preamble may be configured not to include a part or all of the subfields other than the NSTS And Midamble Periodicity field. In a case where the Doppler field is not present, the NSTS And Midamble Periodicity field can be appropriately set by being defined in a similar manner to a case where the value in the Doppler field is 0.

The present invention can also be embodied by processing that supplies a program capable of fulfilling one or more functions of the above-described exemplary embodiment to a system or an apparatus via a network or a storage medium, and causes one or more processors in a computer of the system or apparatus to read out and execute the program. Further, the present invention can also be embodied by a circuit (for example, an ASIC) capable of fulfilling one or more functions.

The present invention is not limited to the above-described exemplary embodiment, and can be changed and modified in various manners without departing from the spirit and the scope of the present invention. Therefore, the following claims are attached to make the scope of the present invention public.

According to the present invention, the communication apparatus or the information processing apparatus can communicate information indicating that the number of streams is 9 or greater in the PHY frame.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
at least one memory that stores a set of instructions; and
at least one processor that executes the instructions, the instructions, when executed, causing the apparatus to perform operations comprising:
generating a first frame including preamble and a data field, and
transmitting the first frame,
wherein the preamble includes
a Legacy Short Training Field (L-STF),
a Legacy Long Training Field (L-LTF),
a Legacy Signal Field (L-SIG),
an EHT Short Training Field (EHT-STF), and
an EHT Long Training Field (EHT-LTF),
wherein, in the preamble, the EHT-STF is located after the L-SIG, and the preamble includes, between the L-SIG and the EHT-STF, at least a first subfield formed of four consecutive bits indicating the number of spatial streams used in multiple input multiple output (MIMO) communication in a case where communication for a Single User (SU) of EHT is performed, a second subfield formed of two consecutive bits indicating a Guard Interval (GI) period and a size of the EHT-LTF, a third subfield formed of one bit indicating information about coding, a fourth subfield formed of one bit indicating information about an LDPC Extra Symbol Segment, a fifth subfield formed of two consecutive bits indicating information about a Pre-FEC Padding Factor, a sixth subfield formed of one bit indicating information about Packet Extension (PE) Disambiguity, a seventh subfield formed of four consecutive bits indicating information on Modulation and Coding Scheme (MCS) used for communication, an eighth subfield formed of four consecutive bits indicating information related to Spatial Reuse, and a ninth subfield formed of four consecutive bits to be used for CRC, and a tenth subfield formed of one bit of a reserved area, and an eleventh subfield indicating information different from information on the CRC, the third subfield is located after the first subfield, and the seventh subfield is located before the third subfield,
wherein the eighth subfield is not adjacent to the tenth subfield before or after the tenth subfield,
wherein the eleventh subfield is located between the tenth subfield and the ninth subfield, the fifth subfield is located after the fourth subfield, and the sixth subfield is located after the fifth subfield, wherein, in the data field, data to be transmitted with the number of spatial streams corresponding to the number of spatial streams indicated by the first subfield is included, wherein the number of the spatial streams indicates one, in a case where all bits in the first subfield formed of four consecutive bits indicating information related to spatial stream are set to 0, and wherein in a case where information indicated by a predetermined subfield included between the L-SIG and the EHT-STF is a predetermined value, the number, more than 8, of spatial streams indicated by the first subfield is validated.

2. The communication apparatus according to claim 1, wherein the preamble further includes a Repeated Legacy Signal Field (RL-SIG) between the L-SIG and the EHT-STF.

3. The communication apparatus according to claim 1, further comprising a plurality of antennas, wherein the first frame is transmitted via the plurality of antennas.

4. The communication apparatus according to claim 3, wherein the communication apparatus includes 16 antennas.

5. The communication apparatus according to claim 1, wherein an EHT Multi User (MU) Physical layer Protocol Data Unit (PPDU) as a second frame including a preamble and a data field is transmitted, and wherein the first subfield of four consecutive bits indicating the number of spatial streams is not included in the signal field in the PHY preamble of the second frame.

6. The communication apparatus according to claim 1, wherein the first subfield stores information indicating that the number of spatial streams is 16.

7. The communication apparatus according to claim 1, wherein information related to beamforming is further included between the L-SIG and the EHT-STF.

8. The communication apparatus according to claim 1, wherein the number of spatial streams indicates 16, when all bits in the first subfield formed of four consecutive bits indicating information related to spatial stream are set to 1.

9. A communication apparatus comprising:

at least one memory that stores a set of instructions; and at least one processor that executes the instructions, the instructions, when executed, causing the apparatus to perform operations comprising:

receiving a frame including a preamble and a data field; and processing the frame received, wherein the preamble includes a Legacy Short Training Field (L-STF), a Legacy Long Training Field (L-LTF), a Legacy Signal Field (L-SIG), an EHT Short Training Field (EHT-STF), and an EHT Long Training Field (EHT-LTF), wherein, in the preamble, the EHT-STF is located after the L-SIG, and the preamble includes, between the L-SIG and the EHT-STF, at least a first subfield formed of four consecutive bits indicating the number of spatial streams used in multiple input multiple output (MIMO) communication in a case where communication for a Single User (SU) of EHT is performed, a second subfield formed of two consecutive bits indicating a Guard Interval (GI) period and a size of the EHT-LTF, a third subfield formed of one bit indicating information about coding, a fourth subfield formed of one bit indicating information about an LDPC Extra Symbol Segment, a fifth subfield formed of two consecutive bits indicating information about a Pre-FEC Padding Factor, a sixth subfield formed of one bit indicating information about Packet Extension (PE) Disambiguity, a seventh subfield formed of four consecutive bits indicating information on Modulation and Coding Scheme (MCS) used for communication, an eighth subfield formed of four consecutive bits indicating information related to Spatial Reuse, and a ninth subfield formed of four consecutive bits to be used for CRC, and a tenth subfield formed of one bit of a reserved area, and an eleventh subfield indicating information different from information on the CRC, the third subfield is located after the first subfield, and the seventh subfield is located before the third subfield, wherein the eighth subfield is not adjacent to the tenth subfield before or after the tenth subfield, wherein the eleventh subfield is located between the tenth subfield and the ninth subfield, the fifth subfield is located after the fourth subfield, and the sixth subfield is located after the fifth subfield, wherein, in the data field, data to be received with the number of spatial streams corresponding to the number of spatial streams indicated by the first subfield is included, wherein the number of the spatial streams indicates one, in a case where all bits in the first subfield formed of four consecutive bits indicating information related to spatial stream are set to 0, and wherein in a case where information indicated by a predetermined subfield included between the L-SIG and the EHT-STF is a predetermined value, the number, more than 8, of spatial streams indicated by the first subfield is validated.

10. The communication apparatus according to claim 9, further comprising a plurality of antennas, wherein the frame is received via the plurality of antennas.

11. An information processing apparatus comprising: at least one memory that stores a set of instructions; and at least one processing circuit;

wherein the information processing apparatus is caused, by the at least one processing circuit executing the set of instructions and/or the at least one processing circuit itself operating, to perform operations comprising:

generating a frame including a preamble and a data field, and transmitting the frame, wherein the preamble includes:

a Legacy Short Training Field (L-STF), a Legacy Long Training Field (L-LTF), a Legacy Signal Field (L-SIG), an EHT Short Training Field (EHT-STF), and an EHT Long Training Field (EHT-LTF), wherein, in the preamble, the EHT-STF is located after the L-SIG, and the preamble includes, between the L-SIG and the EHT-STF, at least a first subfield formed of four consecutive bits indicating the number of spatial streams used in multiple input multiple output (MIMO) communication in a case where communication for a Single User (SU) of EHT is performed, a second subfield formed of two consecutive bits indicating a Guard Interval (GI) period and a size of the EHT-LTF, a third subfield formed of one bit indicating information about coding, a fourth subfield formed of one bit indicating information about an LDPC Extra Symbol Segment, a fifth subfield formed of two consecutive bits indicating information about a Pre-FEC Padding Factor, a sixth subfield formed of one bit indicating information about Packet Extension (PE) Disambiguity, a seventh subfield formed of four consecutive bits indicating information on Modulation and Coding Scheme (MCS) used for communication, an eighth subfield formed of four consecutive bits indicating information related to Spatial Reuse, and a ninth subfield formed of four consecutive bits to be used for CRC, a tenth subfield formed of one bit of a reserved area, and an eleventh subfield indicating information different from information on the CRC, the third subfield is located after the first subfield, and the seventh subfield is located before the third subfield, wherein the eighth subfield is not adjacent to the tenth subfield before or after the tenth subfield, wherein the eleventh subfield is located between the tenth subfield and the ninth subfield, the fifth subfield is located after the fourth subfield, and the sixth subfield is located after the fifth subfield, wherein, in the data field, data to be transmitted with the number of spatial streams corresponding to the number of spatial streams indicated by the first subfield is included, wherein the number of the spatial streams indicates one, in a case where all bits in the first subfield formed of four consecutive bits indicating information related to spatial stream are set to 0, and wherein in a case where information indicated by a predetermined subfield included between the L-SIG and the EHT-STF is a predetermined value, the number, more than 8, of spatial streams indicated by the first subfield is validated.

12. A method for controlling a communication apparatus, the method comprising:

generating a frame including a preamble and a data field, and transmitting the frame, wherein the preamble includes a Legacy Short Training Field (L-STF), a Legacy Long Training Field (L-LTF), a Legacy Signal Field (L-SIG), an EHT Short Training Field (EHT-STF), and an EHT Long Training Field (EHT-LTF), wherein, in the preamble, the EHT-STF is located after the L-SIG, and the preamble includes, between the L-SIG and the EHT-STF, at least a first subfield formed of four consecutive bits indicating the number of spatial streams used in multiple input multiple output (MIMO) communication in a case where communication for a Single User (SU) of EHT is performed, a second subfield formed of two consecutive bits indicating a Guard Interval (GI) period and a size of the EHT-LTF, a third subfield formed of one bit indicating information about coding, a fourth subfield formed of one bit indicating information about an LDPC Extra Symbol Segment, a fifth subfield formed of two consecutive bits indicating information about a Pre-FEC Padding Factor, a sixth subfield formed of one bit indicating information about Packet Extension (PE) Disambiguity, a seventh subfield formed of four consecutive bits indicating information on Modulation and Coding Scheme (MCS) used for communication, an eighth subfield formed of four consecutive bits indicating information related to Spatial Reuse, and a ninth subfield formed of four consecutive bits to be used for CRC, a tenth subfield formed of one bit of a reserved area, and an eleventh subfield indicating information different from information on the CRC, the third subfield is located after the first subfield, and the seventh subfield is located before the third subfield, wherein the eighth subfield is not adjacent to the tenth subfield before or after the tenth subfield, wherein the eleventh subfield is located between the tenth subfield and the ninth subfield, the fifth subfield is located after the fourth subfield, and the sixth subfield is located after the fifth subfield, wherein, in the data field, data to be transmitted with the number of spatial streams corresponding to the number of spatial streams indicated by the first subfield is included, wherein the number of the spatial streams indicates one, in a case where all bits in the first subfield formed of four consecutive bits indicating information related to spatial stream are set to 0, and wherein in a case where information indicated by a predetermined subfield included between the L-SIG and the EHT-STF is a predetermined value, the number, more than 8, of spatial streams indicated by the first subfield is validated.

13. A method for controlling a communication apparatus, the method comprising:

receiving a frame including a preamble and a data field; and processing the frame received, wherein the preamble includes a Legacy Short Training Field (L-STF), a Legacy Long Training Field (L-LTF), a Legacy Signal Field (L-SIG), an EHT Short Training Field (EHT-STF), and an EHT Long Training Field (EHT-LTF), wherein, in the preamble, the EHT-STF is located after the L-SIG, and the preamble includes, between the L-SIG and the EHT-STF, at least a first subfield formed of four consecutive bits indicating the number of spatial streams used in multiple input multiple output (MIMO) communication in a case where communication for a Single User (SU) of EHT is performed, a second subfield formed of two consecutive bits indicating a Guard Interval (GI) period and a size of the EHT-LTF, a third subfield formed of one bit indicating information about coding, a fourth subfield formed of one bit indicating information about an LDPC Extra Symbol Segment, a fifth subfield formed of two consecutive bits indicating information about a Pre-FEC Padding Factor, a sixth subfield formed of one bit indicating information about Packet Extension (PE) Disambiguity, a seventh subfield formed of four consecutive bits indicating information on Modulation and Coding Scheme (MCS) used for communication, an eighth subfield formed of four consecutive bits indicating information related to Spatial Reuse, and a ninth subfield formed of four consecutive bits to be used for CRC, and a tenth subfield formed of one bit of a reserved area, and an eleventh subfield indicating information different from information on the CRC, the third subfield is located after the first subfield, and the seventh subfield is located before the third subfield, wherein the eighth subfield is not adjacent to the tenth subfield before or after then tenth subfield, wherein the eleventh subfield is located between the tenth subfield and the ninth subfield, the fifth subfield is located after the fourth subfield, and the sixth subfield is located after the fifth subfield, wherein, in the data field, data to be received with the number of spatial streams corresponding to the number of spatial streams indicated by the first subfield is included, wherein the number of the spatial streams indicates one, in a case where all bits in the first subfield formed of four consecutive bits indicating information related to spatial stream are set to 0, and wherein in a case where information indicated by a predetermined subfield included between the L-SIG and the EHT-STF is a predetermined value, the number, more than 8, of spatial streams indicated by the first subfield is validated.

14. A method for controlling an information processing apparatus, the method comprising:

generating a frame including a preamble and a data field, and transmitting the frame, wherein the preamble includes a Legacy Short Training Field (L-STF), a Legacy Long Training Field (L-LTF), a Legacy Signal Field (L-SIG), an EHT Short Training Field (EHT-STF), and an EHT Long Training Field (EHT-LTF), wherein, in the preamble, the EHT-STF is located after the L-SIG, and the preamble includes, between the L-SIG and the EHT-STF, at least a first subfield formed of four consecutive bits indicating the number of spatial streams used in multiple input multiple output (MIMO) communication in a case where communication for a Single User (SU) of EHT is performed, a second subfield formed of two consecutive bits indicating a Guard Interval (GI) period and a size of the EHT-LTF, a third subfield formed of one bit indicating information about coding, a fourth subfield formed of one bit indicating information about an LDPC Extra Symbol Segment, a fifth subfield formed of two consecutive bits indicating information about a Pre-FEC Padding Factor, a sixth subfield formed of one bit indicating information about Packet Extension (PE) Disambiguity, a seventh subfield formed of four consecutive bits indicating information on Modulation and Coding Scheme (MCS) used for communication, an eighth subfield formed of four consecutive bits indicating information related to Spatial Reuse, and a ninth subfield formed of four consecutive bits to be used for CRC, a tenth subfield formed of one bit of a reserved area, and an eleventh subfield indicating information different from information on the CRC, the third subfield is located after the first subfield, and the seventh subfield is located before the third subfield, wherein the eighth subfield is not adjacent to the tenth subfield before or after the tenth subfield, wherein the eleventh subfield is located between the tenth subfield and the ninth subfield, the fifth subfield is located after the fourth subfield, and the sixth subfield is located after the fifth subfield, wherein, in the data field, data to be transmitted with the number of spatial streams corresponding to the number of spatial streams indicated by the first subfield is included, wherein the number of the spatial streams indicates one, in a case where all bits in the first subfield formed of four consecutive bits indicating information related to spatial stream are set to 0, and wherein in a case where information indicated by a predetermined subfield included between the L-SIG and the EHT-STF is a predetermined value, the number, more than 8, of spatial streams indicated by the first subfield is validated.

15. A non-transitory computer-readable storage medium storing a program for causing a computer to operate as the communication apparatus to perform a process, the process comprising:

generating a first frame including a preamble and a data field, and transmitting the first frame, wherein the preamble includes a Legacy Short Training Field (L-STF), a Legacy Long Training Field (L-LTF), a Legacy Signal Field (L-SIG), an EHT Short Training Field (EHT-STF), and an EHT Long Training Field (EHT-LTF), wherein, in the preamble, the EHT-STF is located after the L-SIG, and the preamble includes, between the L-SIG and the EHT-STF, at least a first subfield formed of four consecutive bits indicating the number of spatial streams used in multiple input multiple output (MIMO) communication in a case where communication for a Single User (SU) of EHT is performed, a second subfield formed of two consecutive bits indicating a Guard Interval (GI) period and a size of the EHT-LTF, a third subfield formed of one bit indicating information about coding, a fourth subfield formed of one bit indicating information about an LDPC Extra Symbol Segment, a fifth subfield formed of two consecutive bits indicating information about a Pre-FEC Padding Factor, a sixth subfield formed of one bit indicating information about Packet Extension (PE) Disambiguity, a seventh subfield formed of four consecutive bits indicating information on Modulation and Coding Scheme (MCS) used for communication, an eighth subfield formed of four consecutive bits indicating information related to Spatial Reuse, and a ninth subfield formed of four consecutive bits to be used for CRC, a tenth subfield formed of one bit of a reserved area, and an eleventh subfield indicating information different from information on the CRC, the third subfield is located after the first subfield, and the seventh subfield is located before the third subfield, wherein the eighth subfield is not adjacent to the tenth subfield before or after the tenth subfield, wherein the eleventh subfield is located between the tenth subfield and the ninth subfield, the fifth subfield is located after the fourth subfield, and the sixth subfield is located after the fifth subfield, wherein, in the data field, data to be transmitted with the number of spatial streams corresponding to the number of spatial streams indicated by the first subfield is included, wherein the number of the spatial streams indicates one, in a case where all bits in the first subfield formed of four consecutive bits indicating information related to spatial stream are set to 0, and wherein in a case where information indicated by a predetermined subfield included between the L-SIG and the EHT-STF is a predetermined value, the number, more than 8, of spatial streams indicated by the first subfield is validated.

16. A non-transitory computer-readable storage medium storing a program for causing a computer to operate as the communication apparatus to perform a process, the process comprising:

receiving a frame including a preamble and a data field; and processing the frame received, wherein the preamble includes:

a Legacy Short Training Field (L-STF), a Legacy Long Training Field (L-LTF), a Legacy Signal Field (L-SIG), an EHT Short Training Field (EHT-STF), and an EHT Long Training Field (EHT-LTF), wherein, in the preamble, the EHT-STF is located after the L-SIG, and the preamble includes, between the L-SIG and the EHT-STF, at least a first subfield formed of four consecutive bits indicating the number of spatial streams used in multiple input multiple output (MIMO) communication in a case where communication for a Single User (SU) of EHT is performed, a second subfield formed of two consecutive bits indicating a Guard Interval (GI) period and a size of the EHT-LTF, a third subfield formed of one bit indicating information about coding, a fourth subfield formed of one bit indicating information about an LDPC Extra Symbol Segment, a fifth subfield formed of two consecutive bits indicating information about a Pre-FEC Padding Factor, a sixth subfield formed of one bit indicating information about Packet Extension (PE) Disambiguity, a seventh subfield formed of four consecutive bits indicating information on Modulation and Coding Scheme (MCS) used for communication, an eight subfield formed of four consecutive bits indicating information related to Spatial Reuse, and a ninth subfield formed of four consecutive bits to be used for CRC, a tenth subfield formed of one bit of a reserved area, and an eleventh subfield indicating information different from information on the CRC, the third subfield is located after the first subfield, and the seventh subfield is located before the third subfield, wherein the eighth subfield is not adjacent to the tenth subfield before or after the tenth subfield, wherein the eleventh subfield is located between the tenth subfield and the ninth subfield, the fifth subfield is located after the fourth subfield, and the sixth subfield is located after the fifth subfield, wherein, in the data field, data to be received with the number of spatial streams corresponding to the number of spatial streams indicated by the first subfield is included, wherein the number of the spatial streams indicates one, in a case where all bits in the first subfield formed of four consecutive bits indicating information related to spatial stream are set to 0, and wherein in a case where information indicated by a predetermined subfield included between the L-SIG and the EHT-STF is a predetermined value, the number, more than 8, of spatial streams indicated by the first subfield is validated.

* * * * *